(12) United States Patent
Sorkin

(10) Patent No.: US 10,072,429 B2
(45) Date of Patent: Sep. 11, 2018

(54) MODIFIED POCKET FORMER

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 0 days.

(21) Appl. No.: 15/430,152

(22) Filed: Feb. 10, 2017

(65) Prior Publication Data
US 2017/0152660 A1 Jun. 1, 2017

Related U.S. Application Data

(63) Continuation of application No. 14/548,868, filed on Nov. 20, 2014, now Pat. No. 9,604,416.

(60) Provisional application No. 62/000,382, filed on May 19, 2014.

(51) Int. Cl.
*B28B 7/30* (2006.01)
*E04G 15/04* (2006.01)
*B28B 23/02* (2006.01)
*B28B 1/14* (2006.01)

(52) U.S. Cl.
CPC ............... *E04G 15/04* (2013.01); *B28B 1/14* (2013.01); *B28B 7/303* (2013.01); *B28B 7/306* (2013.01); *B28B 23/024* (2013.01)

(58) Field of Classification Search
CPC ........... B28B 7/28; B28B 7/303; B28B 7/306; B28B 1/14; E04G 21/12; E04G 2021/128; E04G 15/04; B29C 70/541
See application file for complete search history.

(56) References Cited

U.S. PATENT DOCUMENTS

| | | | | | |
|---|---|---|---|---|---|
| 3,137,971 A | * | 6/1964 | Rhodes | ................... | E04C 5/122 411/455 |
| 3,685,934 A | * | 8/1972 | Huber | ..................... | E04C 5/122 249/43 |
| 3,766,609 A | * | 10/1973 | Brandestini | ............. | E04C 5/122 24/115 R |
| 3,956,797 A | * | 5/1976 | Brandestini | ............. | E04C 5/122 425/111 |
| 4,363,462 A | * | 12/1982 | Wlodkowski | ............. | E04C 5/12 24/115 M |
| 4,410,162 A | | 10/1983 | Wlodkowski et al. | | |
| 4,773,198 A | * | 9/1988 | Reinhardt | ................ | E04C 5/122 52/223.13 |
| 4,822,270 A | * | 4/1989 | Bonissone | .............. | B29C 33/02 249/122 |

(Continued)

FOREIGN PATENT DOCUMENTS

DE 8108672 U1 7/1981
DE 3123641 A1 3/1982

(Continued)

OTHER PUBLICATIONS

Extended European Search Report issued in European Application No. 14892786.6, dated Dec. 21, 2017 (8 pages).

(Continued)

*Primary Examiner* — Michael Safavi
(74) *Attorney, Agent, or Firm* — Adolph Locklar

(57) ABSTRACT

A pocket former includes a pocket former body and a keyway former. The pocket former is adapted to form a void in a concrete member allowing access to the stressing end of a post-tensioning tendon. The keyway former is adapted to form a keyway in the concrete to allow grout to be more securely retained in the void.

13 Claims, 4 Drawing Sheets

(56) References Cited

U.S. PATENT DOCUMENTS

| | | | | |
|---|---|---|---|---|
| 4,896,470 | A | 1/1990 | Sorkin | |
| 5,072,558 | A * | 12/1991 | Sorkin | B29C 45/14 52/223.13 |
| 5,271,199 | A * | 12/1993 | Northern | E04C 5/12 24/122.6 |
| 5,423,362 | A * | 6/1995 | Knight | B28B 7/16 249/142 |
| 5,436,425 | A | 7/1995 | Sorkin | |
| 5,720,139 | A | 2/1998 | Sorkin | |
| 5,749,185 | A * | 5/1998 | Sorkin | E04C 5/12 24/122.6 |
| 5,755,065 | A * | 5/1998 | Sorkin | E04C 5/12 52/223.13 |
| 5,788,398 | A * | 8/1998 | Sorkin | E04C 5/12 285/138.1 |
| 5,897,102 | A * | 4/1999 | Sorkin | E04C 5/12 249/43 |
| 6,023,894 | A * | 2/2000 | Sorkin | E04C 5/122 24/122.6 |
| 6,027,278 | A * | 2/2000 | Sorkin | E04C 5/122 403/371 |
| 6,040,546 | A | 3/2000 | Sorkin | |
| 6,098,356 | A * | 8/2000 | Sorkin | E04C 5/12 24/122.6 |
| 6,380,508 | B1 | 4/2002 | Sorkin | |
| 6,381,912 | B1 * | 5/2002 | Sorkin | E04C 5/08 24/459 |
| 6,393,781 | B1 * | 5/2002 | Sorkin | E04C 5/122 52/223.13 |
| 6,631,596 | B1 * | 10/2003 | Sorkin | E04C 5/12 24/122.6 |
| 6,651,949 | B1 * | 11/2003 | Westhoff | B28B 23/00 249/142 |
| 6,761,002 | B1 * | 7/2004 | Sorkin | E04C 5/12 403/374.1 |
| 6,817,148 | B1 | 11/2004 | Sorkin | |
| 7,174,685 | B2 * | 2/2007 | Hayes | E04C 5/12 52/223.6 |
| 7,216,842 | B2 * | 5/2007 | Watson | B28B 7/28 249/142 |
| 7,275,347 | B2 * | 10/2007 | Hayes | E04C 5/12 24/122.6 |
| 7,596,915 | B2 * | 10/2009 | Lee | E02D 31/02 249/142 |
| D615,219 | S | 5/2010 | Sorkin | |
| 7,765,752 | B2 * | 8/2010 | Hayes | E04C 5/122 403/374.1 |
| 8,065,845 | B1 * | 11/2011 | Sorkin | E04C 5/122 24/115 M |
| 8,069,624 | B1 * | 12/2011 | Sorkin | E04C 5/12 403/314 |
| 8,104,246 | B2 * | 1/2012 | Nieto | E04C 5/122 52/223.13 |
| 8,251,344 | B1 * | 8/2012 | Sorkin | E04C 5/122 249/177 |
| 8,286,309 | B2 * | 10/2012 | Landry | F16G 11/048 24/122.6 |
| 9,303,406 | B2 | 4/2016 | Sorkin | |
| 2002/0007604 | A1 * | 1/2002 | Wallstein | E04C 5/122 52/223.13 |
| 2002/0096619 | A1 * | 7/2002 | Lancelot, III | B28B 23/005 249/91 |
| 2006/0033003 | A1 * | 2/2006 | Watson | B28B 7/28 249/177 |
| 2007/0289239 | A1 | 12/2007 | Lee et al. | |
| 2008/0083130 | A1 * | 4/2008 | Parkes | E01C 11/14 33/562 |
| 2012/0011788 | A1 * | 1/2012 | Nieto | E04C 5/122 52/223.13 |
| 2015/0300021 | A1 * | 10/2015 | Hayes | B28B 23/046 33/700 |
| 2015/0330078 | A1 * | 11/2015 | Sorkin | E04B 1/66 52/223.13 |
| 2015/0330079 | A1 | 11/2015 | Sorkin | |
| 2016/0208490 | A1 * | 7/2016 | Wilson | E04C 5/08 |

FOREIGN PATENT DOCUMENTS

| | | |
|---|---|---|
| GB | 757553 A | 9/1956 |
| GB | 811709 A | 4/1959 |
| JP | 2999735 B2 | 1/2000 |
| JP | 2012202069 A | 10/2012 |

OTHER PUBLICATIONS

Communication issued in European Application No. 16182618.5, dated Sep. 22, 2017, 4 pages.

Search Report issued in European Application No. 16182618.5, dated Nov. 10, 2016, 7 pages.

* cited by examiner

MODIFIED POCKET FORMER

CROSS-REFERENCE TO RELATED APPLICATIONS

This application is a continuation application of U.S. application Ser. No. 14/548,868, filed Nov. 20, 2014, which is itself a non-provisional application which claims priority from U.S. provisional application No. 62/000,382, filed May 19, 2014, which is incorporated by reference herein in its entirety.

TECHNICAL FIELD/FIELD OF THE DISCLOSURE

The present disclosure relates generally to post-tensioned, prestressed concrete construction. The present disclosure relates specifically to methods and apparatuses forming a stressing pocket in a post-tensioned, prestressed concrete member.

BACKGROUND OF THE DISCLOSURE

Many structures are built using concrete, including, for instance, buildings, parking structures, apartments, condominiums, hotels, mixed-use, casinos, hospitals, medical buildings, government buildings, research/academic institutions, industrial, malls, bridges, pavement, tanks, reservoirs, silos, foundations, sports courts, and other structures.

Prestressed concrete is structural concrete in which internal stresses are introduced to reduce potential tensile stresses in the concrete resulting from applied loads; this can be accomplished by two methods—post-tensioned prestressing and pre-tensioned prestressing. In a post-tensioned member, the prestressing member is tensioned after the concrete has attained a specified strength. In post-tensioning applications, the prestressing assembly, commonly known as a tendon, may include for example and without limitation, anchorages, the prestressing member, and sheathes or ducts. For the purposes of this disclosure, the prestressing member will be referred to as a "cable", although one having ordinary skill in the art with the benefit of this disclosure will understand that the prestressing member could be any suitable material exhibiting tensile strength which can be elongated including, for example and without limitation, reinforcing steel, single or multi strand cable. One having ordinary skill in the art with the benefit of this disclosure will likewise understand that the prestressing member may be formed from a metal or composite without deviating from the scope of this disclosure. The tendon generally includes an anchorage at each end. The cable is generally fixedly coupled to a fixed anchorage positioned at one end of the tendon, the so-called "fixed-end", and is adapted to be stressed at the other anchor, the "stressing-end" of the tendon.

In order to allow access to the stressing-end of the tendon once the concrete member is poured, a pocket former may be utilized to, for example, prevent concrete from filling in the area between the stressing-end anchor and the concrete element used to form the concrete member. As understood in the art, the concrete element may be a form or mold into which concrete is poured or otherwise introduced into to give shape to the concrete as it sets or hardens thus forming the concrete member. Once the concrete has sufficiently hardened and the form is removed, the pocket former is removed from the concrete member. Generally, pocket formers are frustoconical in shape to, for example, allow for easier removal from the concrete member. Typically, once the tendon is stressed, the pocket formed by the pocket former is filled with a material such as a cementitious chloride-free grout or concrete to, for example, provide fire protection and corrosion protection.

SUMMARY

The present disclosure provides for a pocket former. The pocket former may include a pocket former body. The pocket former body may have an outer surface. The pocket former may further include a keyway former. The keyway former may be adapted to be positioned on the outer surface of the pocket former body. The keyway former may be generally annular in shape and having an external surface.

The present disclosure also provides for a method of forming a post-tensioned concrete member. The method may include positioning a post-tensioning tendon within a concrete element. The post-tensioning tendon may include a tension member, fixed anchor, and a stressing anchor. The method may further include positioning a pocket former between the stressing anchor and the concrete element. The pocket former may include a pocket former body. The pocket former body may have an outer surface and a tension member channel. The pocket former body may be adapted to form a void in the concrete between the stressing end anchor and the concrete element. The pocket former may further include a keyway former. The keyway former may be adapted to be positioned on the outer surface of the pocket former body. The keyway former may be generally annular in shape and may have an external surface. The keyway former may be adapted to form a keyway in the concrete about the void. The method may further include inserting the tension member through the tension member channel of the pocket former body; placing concrete into the concrete element such that the post-tensioning tendon and pocket former are encased in cement; removing the pocket former body from the cement; and removing the keyway former from the cement.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
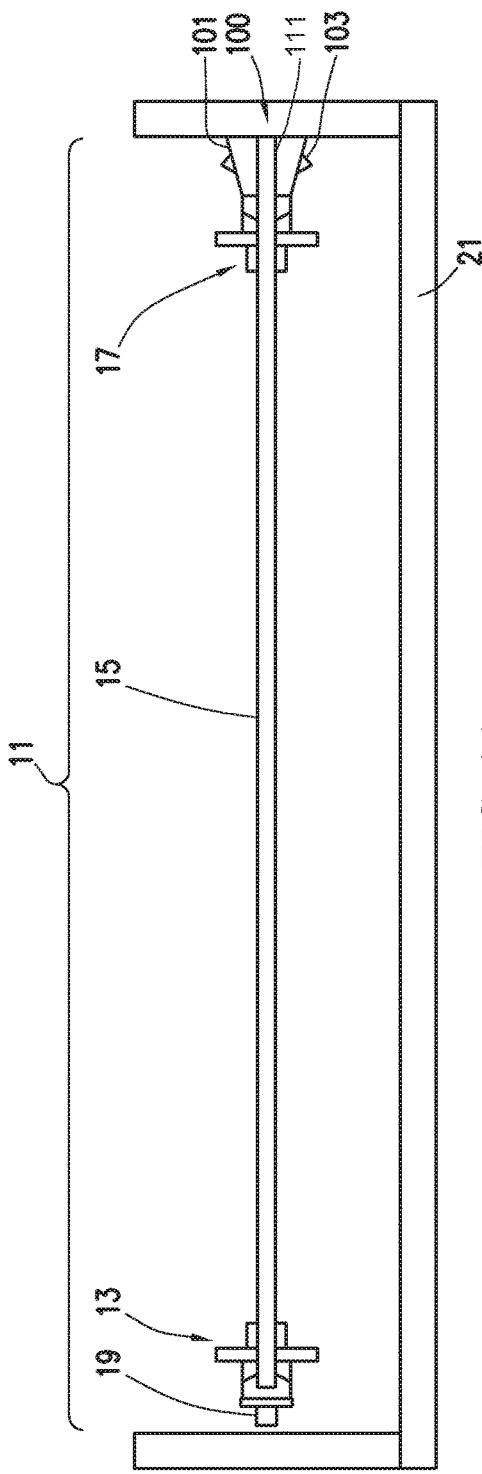
FIGS. 1A-E depict a partial cross section of a concrete pouring procedure consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
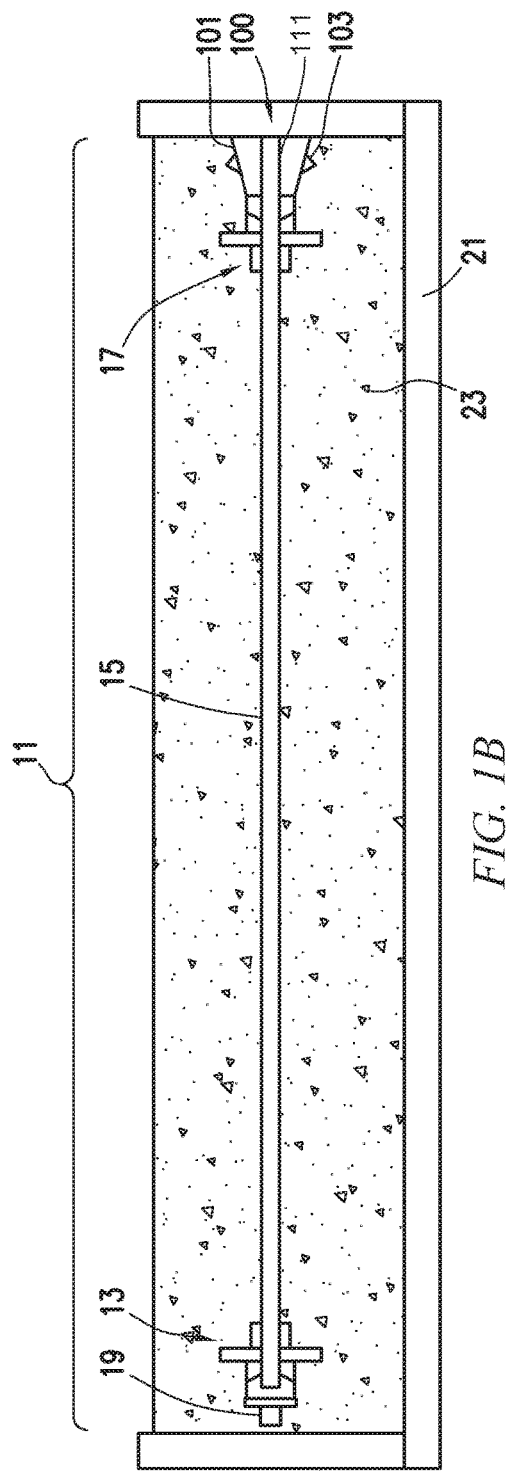

When stressing post-tensioned concrete members, anchoring systems may be provided to hold the post-tensioning tendon both before and after stressing. In some embodiments, as depicted in FIGS. 1a-b, post-tensioning tendon 11 may be positioned within concrete element 21. Post-tensioning tendon 11 may include for example and without limitation fixed end anchor 13, tension member 15, and stressing end anchor 17. In some embodiments, post-tensioning tendon 11 may also include a sheath (not shown) positioned about tension member 15 and one or more seals (not shown) between the sheath and each anchor. The sheath and seals may, for example, protect tension member 15 from corrosion after concrete 23 (shown in FIG. 1b) is poured. Additionally, the sheath and seals may, for example, prevent concrete from ingressing into tension member 15 and preventing or retarding its tensioning as discussed below. In some embodiments, a seal for fixed end anchor 13 may be omitted. As depicted in FIG. 1a, in some embodiments, fixed end anchor may be positioned within concrete element 21 such that it will be completely encased in concrete 23. In some embodiments, fixed end cap 19 may be positioned at the end of fixed end anchor 13 to, for example, protect tension member 15 from corrosion after concrete 23 is poured.

Stressing end anchor 17 may be positioned within concrete element 21 such that it is substantially surrounded by concrete 23. Pocket former 100 may be positioned between the end of stressing end anchor 17 and concrete element 21. Pocket former 100 may be adapted to, for example and without limitation, prevent concrete 23 from filling the space between stressing end anchor 17 and the edge of the resultant concrete member formed by concrete 23 within form 21. Pocket former 100 may thus allow access to tension member 15 from without the concrete member once it is sufficiently hardened and concrete element 21 is removed.

Figure 1C:
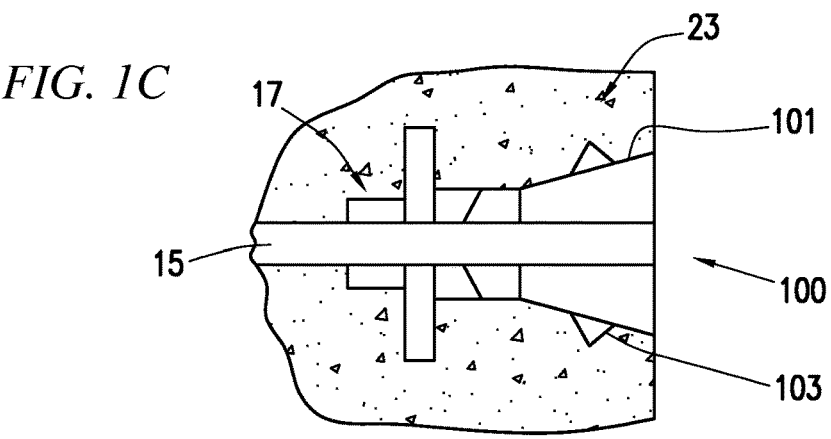
Figure 1D:
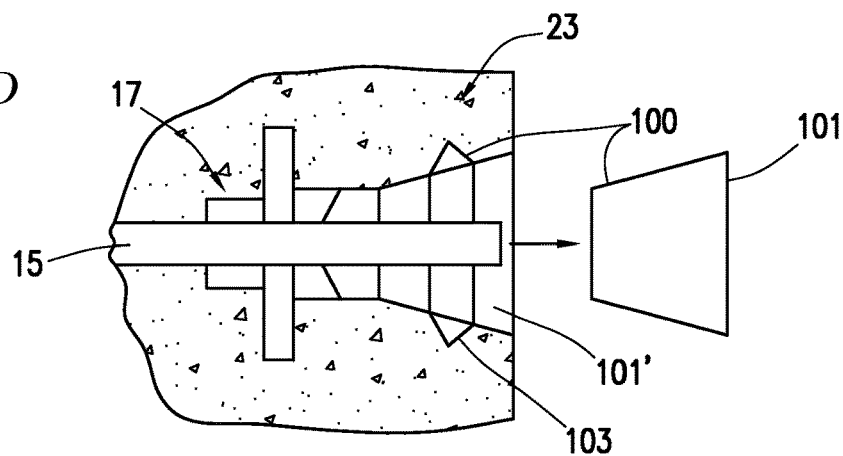
Figure 1E:
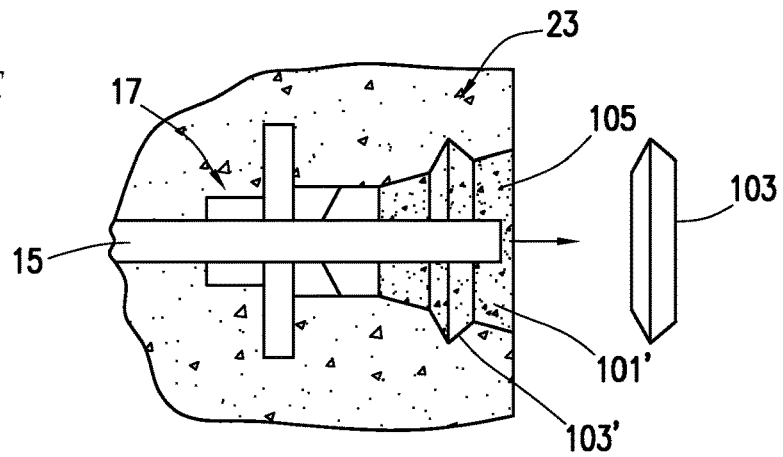

In some embodiments, as depicted in FIG. 1c, pocket former 100 may include pocket former body 101. In some embodiments, pocket former body 101 may include a coupler (not shown) for coupling pocket former 100 to stressing end anchor 17. In some embodiments, pocket former body 101 may be generally hollow. In some embodiments, pocket former body 101 may include tension member channel 111 adapted to allow tension member 15 to pass through pocket former 100 when pocket former 100 is installed onto stressing end anchor 17. In some embodiments, pocket former body 101 may be a generally cylindrical member. One having ordinary skill in the art with the benefit of this disclosure will understand that pocket former body 101 may be any shape suitable for providing a pocket in concrete 23 to allow access to the end of tension member 15 including, but not limited to, cylindrical, frustoconical, prismatoidal, ellipsoidal, or any combination thereof without deviating from the scope of this disclosure. Additionally, the cross-sectional shape of pocket former body 101 may be any shape including, but not limited to, square, round, oblong, ovate, ellipsoidal, triangular, polyhedral, or any combination thereof without deviating from the scope of this disclosure. As depicted in FIGS. 1c-e, pocket former body 101 may be frustoconical. In some embodiments, by tapering pocket former body 101 inward from the edge of concrete 23, removal of pocket former body 101 from concrete 23 may, for example and without limitation, be accomplished more easily. As depicted in FIG. 1d, when pocket former body 101 is removed from concrete 23 (once concrete 23 has reached a sufficient strength), cavity 101' is left in concrete 23 corresponding with the outside shape of pocket former body 101.

In some embodiments, pocket former 100 may further include keyway former 103. In some embodiments, keyway former 103 may be generally annular in shape and may be positioned on the outer surface of pocket former 100. As depicted in FIGS. 1c-e, at least a part of keyway former 103 may extend radially outwardly from pocket former body 101. As depicted in FIG. 1e, when keyway former 103 is removed from concrete 23, keyway 103' may be left in concrete 23 corresponding with the outside shape of pocket former body 101. In some embodiments, once pocket former body 101 and/or keyway former 103 are removed from concrete 23, tension member 15 may be placed under tensile stress. In some embodiments, stressing end anchor 17 may be adapted to allow tension member 15 to extend in length and be stressed against fixed end anchor 13 (now embedded in cement 23), while preventing retraction of tension member 15 once stressed. In some embodiments, tension member 15 may be cut to length such that it does not, for example, extend beyond the edge of concrete 23. In some embodiments, once sufficient tension has been applied, cavity 101' and keyway 103' may, as depicted in FIG. 1e, be filled with filling material 105. Filling material 105 may, as understood in the art, be grout, a cementitious chloride-free grout, or concrete. In some embodiments, a stressed end cap (not shown) may be installed over the end of tension member 15 to, for example and without limitation, prevent filling material 105 from entering stressed end anchor 17 and tension member 15. In some embodiments, keyway 103' may provide more surface area and/or one or more locking features into which filling material 105 may fill, thus, for example and without limitation, preventing filling material 105 from delaminating or otherwise coming loose from or moving relative to concrete 23.

In some embodiments, locking features may include, for example and without limitation, textured surfaces, ridges, grooves, recesses, or protrusions from or into concrete 23 adapted to prevent movement of filling material 105 relative to concrete 23. For example, FIGS. 1a-e depict embodiments in which keyway former 103 is generally annular and triangular in cross section, thus forming a generally annular and triangular keyway 103'.

Figure 2:
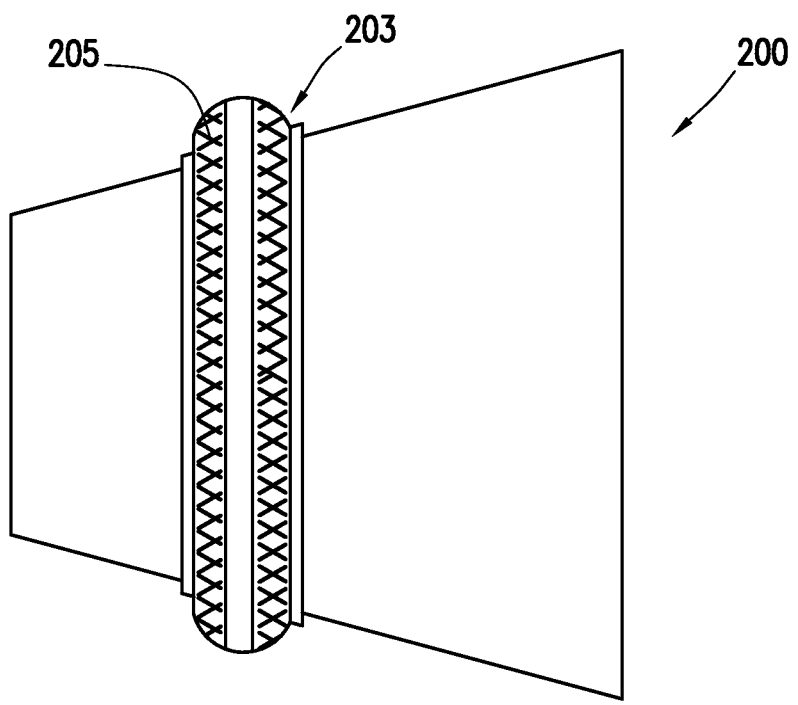
FIG. 2 depicts a pocket former consistent with embodiments of the present disclosure.

In some embodiments, as depicted in FIG. 2, pocket former 200 may include keyway former 203 which is generally annular and rounded in cross section. Additionally, in some embodiments, keyway former 203 may include surface texture 205 adapted to form a corresponding surface texture in the resulting keyway (not shown). Although shown in FIG. 2 as cross-hatched, one having ordinary skill in the art with the benefit of this disclosure will understand that surface texture 205 may be any pattern including but not limited to cross hatched, grooved, stippled, ridged, knurled, fluted, or any combination thereof. Surface texture 205 may be formed as protrusions from keyway former 203, as depressions into keyway former 203, or any combination thereof.

Figure 3:
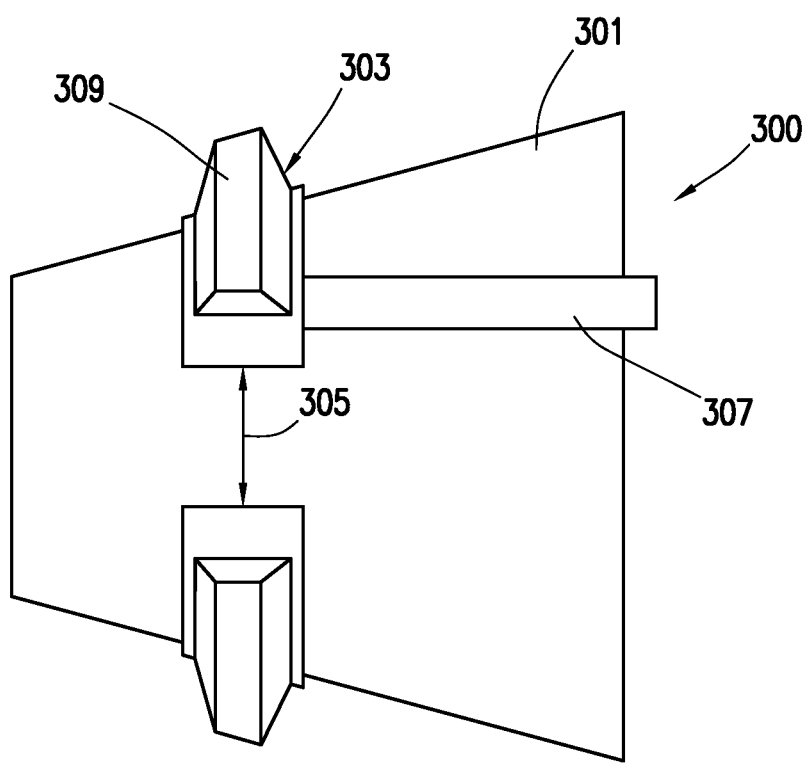
FIG. 3 depicts a pocket former consistent with embodiments of the present disclosure.

In some embodiments, as depicted in FIG. 3, pocket former 300 may include keyway former 303 which is discontinuous about pocket former body 301. Gap 305 may, for example and without limitation, allow for easier removal of keyway former 303 from the concrete member.

In some embodiments, keyway former 303 may further include one or more removal features adapted to assist with the removal of keyway former 303. For example, FIG. 3 depicts embodiments in which keyway former includes tab 307. Tab 307 may, in some embodiments, be coupled to the exterior of pocket former body 301. In some embodiments, tab 307 may extend to the end of the cavity formed in the concrete member by pocket former 300 and allow, for example, for simpler removal of keyway former 303.

Figure 4A:
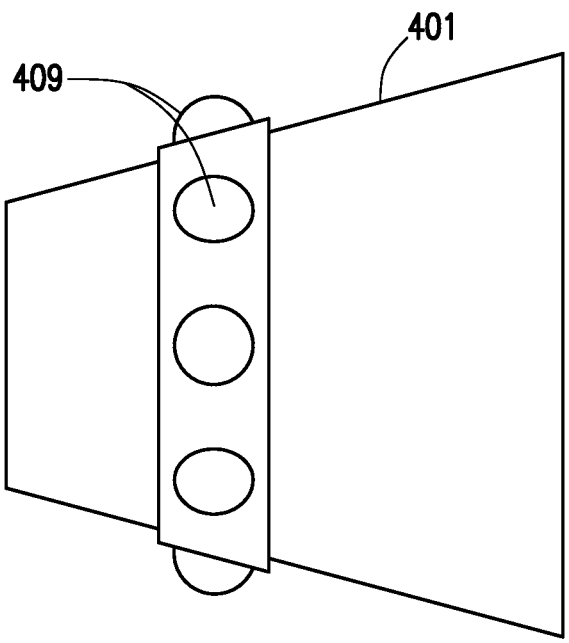
FIG. 4A depicts a pocket former consistent with embodiments of the present disclosure.
Figure 4B:
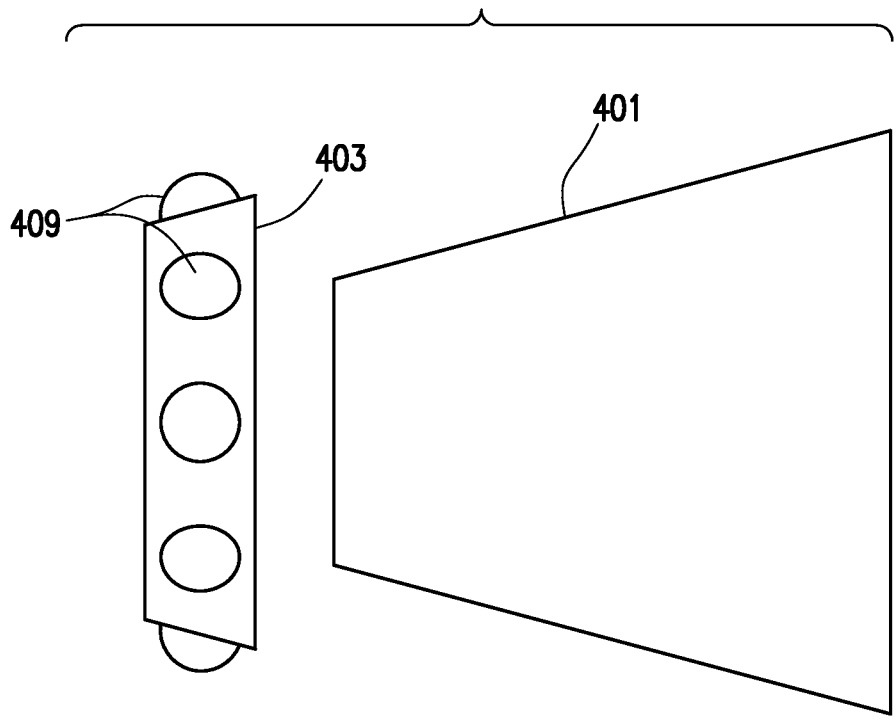
FIG. 4B depicts an exploded view of the pocket former of FIG. 4.

In some embodiments, keyway former 303 may include one or more protrusions 309. Protrusions 309 may be adapted to form recesses in the cavity formed within the concrete member as previously discussed. In some embodiments, as depicted in FIG. 3, protrusions 309 may be generally pyramidal in shape. In some embodiments, as depicted in FIGS. 4a, 4b, protrusions 409 from keyway former 403 may be generally round in shape. One having ordinary skill in the art with the benefit of this disclosure will understand that protrusions from the keyway former may be of any shape, including but not limited to, cylindrical, prismatoidal, ellipsoidal, or any combination thereof.

In some embodiments, as depicted in FIG. 4b, keyway former 403 may be formed as a separate part from pocket former body 401. In other embodiments, keyway former 403 may be formed as a single unit with pocket former body 101. In some such embodiments, keyway former 403 may be coupled to pocket former body 401 by a generally thin member (not shown) capable of being separated when pocket former body 401 is removed from the concrete member. In some embodiments, the generally thin member may include one or more perforations adapted to allow for the separation of pocket former body 401 and keyway former 403.

In some embodiments, as depicted in FIGS. 1d-e, keyway former 103 may be separable from pocket former body 101 to, for example and without limitation, allow for removal of pocket former body 101 before removal of keyway former 103. The removal of pocket former body 101 may allow for a simpler removal of keyway former 103. In some embodiments, by forming keyway former 103 separately from pocket former body 101, keyway former 103 may be used with an existing, unmodified pocket former body. In some embodiments, keyway former 103 may be temporarily coupleable to pocket former body 101 in order to, for example and without limitation, aid in the positioning of pocket former 100 within concrete element 21.

In some embodiments, pocket former body 101 may be formed from a rigid material capable of retaining its shape when concrete 23 is poured. In some embodiments, keyway former 103 may be formed from an elastic or pliable material which may allow keyway former 103 to deform, thus allowing, for example and without limitation, easier removal from concrete 23. In some embodiments, keyway former 103 may be formed from multiple subcomponents. In some such embodiments, protrusions from keyway former 103 (such as those shown in FIGS. 3, 4a) may be formed from a rigid material, while other portions are formed from a more pliable material.

In some embodiments, keyway former 103 may be formed from a pliable material and adapted to be permanently coupled to the exterior surface of pocket former body 101. Keyway former 103 may thus be removed from concrete 23 at the same time as pocket former body 101.

In some embodiments, keyway former 103 may be formed from multiple disconnected subunits. In some such embodiments, multiple protrusions, as depicted in FIGS. 3, 4a-b, may be positioned on the exterior surface of pocket former body 101 and temporarily coupled thereto. In some embodiments, protrusions may be adapted to be decoupled from the rest of keyway former 103.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions and alterations herein without departing from the spirit and scope of the present disclosure.

The invention claimed is:

1. A pocket former comprising:
   a pocket former body, the pocket former body having an outer surface; and
   a keyway former, the keyway former positioned on the outer surface of the pocket former body, the keyway former being generally annular in shape and having an external surface;
   wherein the pocket former body and keyway former are formed as a single unit and wherein the unit includes at least one perforation to allow for the separation of the pocket former body and the keyway former.

2. The pocket former of claim 1 wherein the pocket former body is tapered from a first end to a second end of the pocket former body.

3. The pocket former of claim 1 wherein the keyway former is continuous about the perimeter of the outer surface of the pocket former body.

4. The pocket former of claim 1 wherein the keyway former further comprises a removal feature coupled to the keyway former and extending at least partially along the outer surface of the pocket former body.

5. The pocket former of claim 4 wherein the removal feature comprises a tab, the tab adapted to allow the keyway former to be removed from a concrete member.

6. The pocket former of claim 1 wherein the external surface of the keyway former comprises a surface texture.

7. The pocket former of claim 6 wherein the surface texture comprises at least one of cross hatches, grooves, stipples, ridges, knurls, flutes, or any combination thereof.

8. The pocket former of claim 6 wherein the surface texture comprises at least one of protrusions from the keyway former or depressions into the keyway former.

9. The pocket former of claim 1 wherein the keyway former further comprises at least one protrusion extending from the external surface thereof.

10. The pocket former of claim 9 wherein the protrusion comprises at least one of a cylindrical, prismatoidal, or ellipsoidal protrusion.

11. The pocket former of claim 9 wherein the protrusions are deformable.

12. The pocket former of claim 9 wherein the protrusions are temporarily coupled to an exterior surface of the pocket former body.

13. The pocket former of claim 1 wherein the keyway former is formed from a generally pliable material.

* * * * *